Feb. 22, 1927.
G. P. OLSEN
PRESSURE VALVE
Filed Feb. 20, 1926
1,618,349
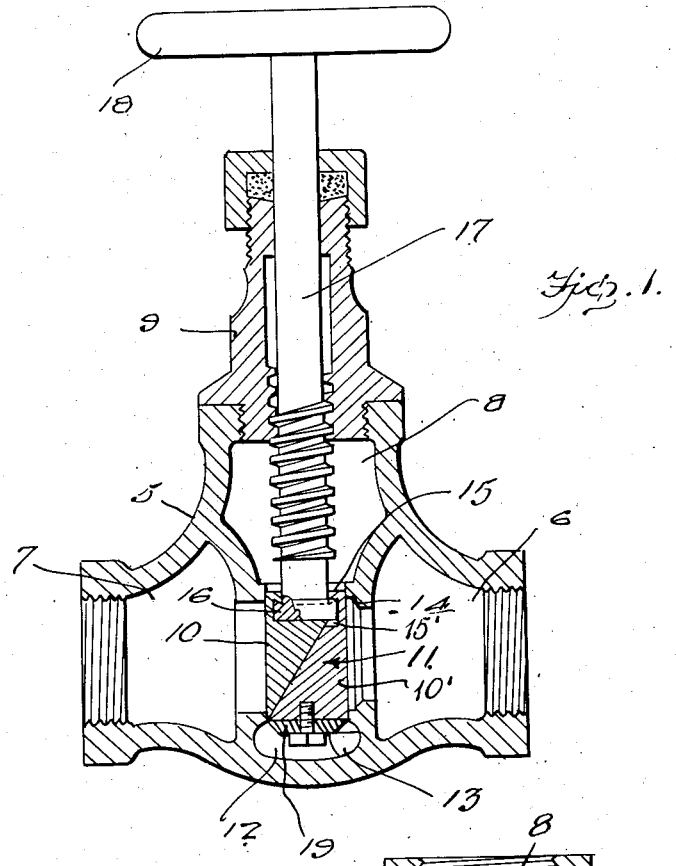
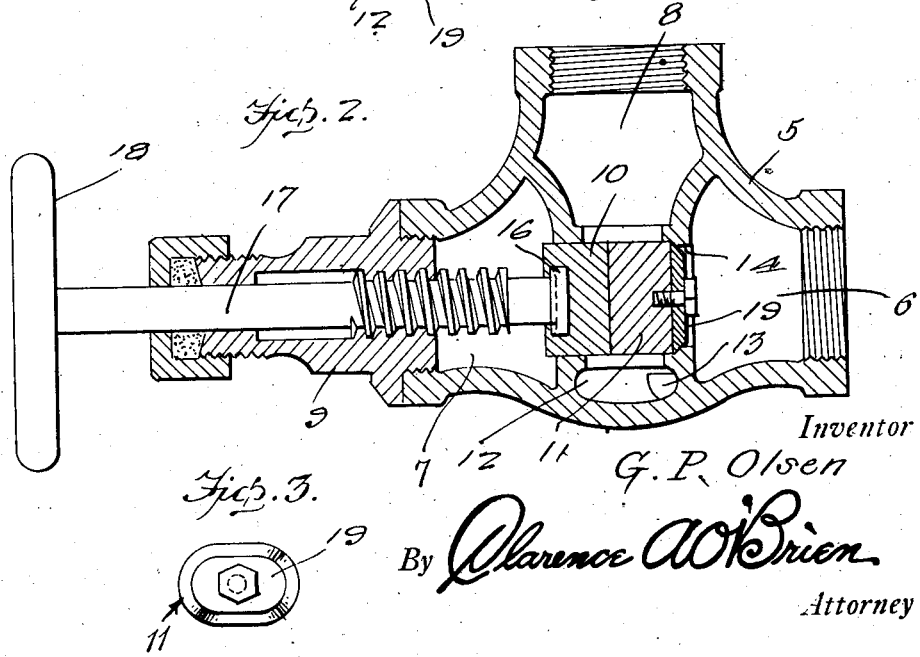
Inventor
G. P. Olsen
By Clarence A. O'Brien
Attorney Patented Feb. 22, 1927.

1,618,349

UNITED STATES PATENT OFFICE.

GEORGE PETER OLSEN, OF L'ANSE, MICHIGAN.

PRESSURE VALVE.

Application filed February 20, 1926. Serial No. 89,695.

This invention relates to pressure valves and has for its primary object to provide such a device that may through a slight rearrangement of its parts be employed as a straight gate valve or angle valve.

A further object of the invention resides in the provision of a cooperatively constructed valve plug and a pair of seating arrangements in order that said plug will be expanded during its downward movement within the communicating passages of the valve for completely closing the same regardless of whether or not the valve is employed as a gate or angle type.

With the foregoing and other objects in view as the nature of the invention will be better understood, the same comprises the novel form, combination, and arrangement of parts hereinafter more fully described, shown in the accompanying drawing and claimed.

In the drawing wherein like reference characters indicate corresponding parts throughout the several views:

Figure 1 is a detail vertical section of my improved valve assembled to provide a straight or gate valve construction.

Figure 2 is a similar view disclosing the parts so assembled as to provide an angle valve in which the valve plug and valve stem are tipped from their previous positions through ninety degrees and the valve plug is further rotated through ninety degrees about the axis of the stem, and Figure 3 is a bottom plan view of the valve plug per se.

Now having particular reference to the drawing, my novel valve constitutes the provision of a casing 5 of general T-shape formed with an eduction passage 6 and a pair of induction passages 7 and 8, either one of which is adapted to threadedly receive a conventional sleeve cap 9, depending upon the use of the valve as the gate type shown in Figure 1 or the angle type shown in Figure 2, all of said, passages intercommunicating by means of plug valve seats of flattened tubular form which intersect with their flattened surfaces in vertical planes at right angles to each other so that the plan view of an intersection is roughly cruciform. At the end of the vertical plug valve seat the casing is formed with a pocket 12 within one side of which is a projection 13, the end of the horizontal plug valve seat adjacent the eduction passage 6 being mortised to provide a tapered valve seat 14 at the interior thereof for the cap 19 hereinafter to be more specifically described.

The vertical and horizontal plug valve seats are each of approximate oval shape in cross section as above described while the plug 11 is also of approximate oval shape as clearly shown in Figure 3, the same snugly fitting within either of the plug valve seats, as the case may be, as brought out in Figures 1 and 2, and for preventing the turning of the plug within its respective seats.

As clearly shown in Figures 1 and 2, the plug valve 11 comprises two wedge shaped sections 10 and 10' respectively, the tapered faces of which are in contacting relation. The upper ends of these sections are formed with cooperatively constructed undercut notches so as to provide a flanged socket 15 for the circular head 16 of a threaded valve stem 17 movable through the sleeve cap 9 and threaded therein as clearly disclosed in both of the views in order that said plug 11 may be raised or lowered within its respective seat through the medium of a hand knob 18. The notch of the section 10' of the plug having its narrow end adjacent the valve stem is deeper than the notch of the corresponding section 10 as clearly shown at 15' in Figure 1 in order that this section will normally tend to drop downwardly for consequently decreasing the cross sectional area of the plug 11. It being apparent that as the plug is being forced into either of the plug valve seats as the case may be, the extreme lower end of the plug will engage either the projection 13 or the aforementioned tapered valve seat 14 causing the plug to expand during further movement of the same due to the movement of the narrow notched section 10' with respect to the other section, and causing the same to bind within the plug valve seat effecting a positive check for the fluid through the eduction passage 6. In order that the plug will not become worn at its lower end due to engagement with the projection or valve seat 13 and 14 respectively, the same is provided with a metallic cap 19. It will thus be seen that I have provided a highly novel, simple, but yet highly efficient form of valve that may be readily adapted for use as a straight or gate valve unit or an angle valve unit and that is constructed with cooperating seats and a plug unit in order that said plug may be expanded within either plug valve seat, for positively cutting off the pressure within the line wherein the valve is installed.

Minor changes may be made in the invention without departing from the spirit and scope of the appended claims.

Having thus described the invention, what I claim as new and desire to secure by Letters Patent is:—

1. In a valve of the class described, a casing having an eduction passage, and a pair of induction passages, a hollow seat unit with intersecting plug valve seats, a valve cap for insertion within either induction passage, a valve stem movable therethrough, and an expansible valve plug upon the stem for engagement horizontally in one or vertically in the other of said plug valve seats.

2. In a valve of the class described, a casing having an eduction passage, and a pair of induction passages, a hollow seat unit with intersecting plug valve seats, a valve cap for insertion within either induction passage, a valve stem movable therethrough, and an expansible valve plug upon the stem for engagement horizontally in one or vertically in the other of said plug valve seats, said valve plug comprising a pair of complementary sections, the contacting surfaces of which are oppositely tapered, and interconnecting means between the sections and the stem whereby one section is forced longitudinally with respect to the other section during its longitudinal movement in said casing.

3. In a valve of the class described, a casing having an eduction passage, and a pair of induction passages, a hollow seat unit with intersecting plug valve seats, a valve cap for insertion within either induction passage, a valve stem movable therethrough, and an expansible valve plug upon the stem for engagement horizontally in one or vertically in the other of said plug valve seats, said valve plug comprising a pair of complementary sections, the contacting surfaces of which are oppositely tapered, and interconnecting means between the sections and the stem whereby one section is forced longitudinally with respect to the other section during its longitudinal movement in said casing, said aforementioned interconnecting means comprising a head formed on the end of the valve stem, the adjacent ends of the complementary sections being formed with cooperatively constructed undercut notches to provide a flanged socket for said head.

In testimony whereof I affix my signature.

GEORGE PETER OLSEN.